Nov. 28, 1950    T. H. THOMAS    2,531,711
CLUTCH CONTROL MECHANISM

Filed Nov. 27, 1944    4 Sheets-Sheet 1

INVENTOR.
THOMAS H. THOMAS
BY
H. O. Clayton

INVENTOR.
THOMAS H. THOMAS
BY H.O. Clayton
ATTORNEY

INVENTOR.
THOMAS H. THOMAS
BY H.O.Clayton
ATTORNEY

Nov. 28, 1950

T. H. THOMAS 2,531,711

CLUTCH CONTROL MECHANISM

Filed Nov. 27, 1944

*Inventor,*
THOMAS H. THOMAS

By H. O. Clayton
*Attorney*

Patented Nov. 28, 1950

2,531,711

UNITED STATES PATENT OFFICE 2,531,711

CLUTCH CONTROL MECHANISM

Thomas H. Thomas, South Bend, Ind., assignor to Bendix Aviation Corporation, South Bend, Ind., a corporation of Delaware Application November 27, 1944, Serial No. 565,202

7 Claims. (Cl. 192—.075)

This invention relates in general to the clutch mechanism of an automotive vehicle and in particular to power means for controlling the operation thereof.

More specifically, the invention relates to a pressure differential operated power means for controlling the operation of a combined centrifugal and spring operated clutch. To this end there is provided a manifold vacuum operated motor operably connected to the pressure plate of the clutch, said plate having mounted thereon centrifugally operated means which are, under certain conditions, supplemented by a certain operation of the clutch springs in effecting the desired engagement of the clutch.

A further feature of the invention relates to the provision of power means for controlling the operation of the aforementioned combined centrifugal and spring operated clutch, said means being controlled in part by the means for operating the engine throttle of the vehicle: apropos the latter feature of the invention it is an object to so correlate the opening of the throttle and the clutch engaging operation of the power means as to insure an effective operation of the centrifugal means in engaging the clutch.

A further object of the invention is to provide a pressure differential operated motor operable, in controlling the clutch engaging operation of a combined centrifugal and spring operated clutch mechanism, to effect two distinct stages of movement of the pressure plate, the first stage being relatively rapid and terminating when the driving and driven clutch elements are to a slight degree loaded by the spring means of the clutch, and the latter stage being relatively slow to effect, under unusual driving conditions, an operation of the clutch springs to supplement the clutch engaging action of the centrifugally operated weights.

Yet another object of the invention is to so construct and arrange the parts of the aforementioned mechanism as to correlate the timing of the operation of the centrifugal mechanism with respect to the timing of the operation of the clutch springs to the end that under ordinary driving conditions the clutch will be engaged by the action of the centrifugal mechanism and to a degree by the clutch springs, the clutch springs, after a certain operation of a manifold vacuum operated motor, supplementing the centrifugal mechanism in completing the engagement of the clutch. This mechanism therefore obviates a slipping clutch when the engine is temporarily subject to a heavy torque for example when the car, heavily loaded, is going up an incline; for the engine torque is proportioned to said manifold vacuum.

An important object of my invention is to provide, in an automotive vehicle provided with an accelerator and with an internal combustion engine having an intake manifold, power means for operating a combined centrifugal and spring operated clutch of said vehicle said power means including a two-stage motor for effecting two stages of clutch engaging operation of the spring means of said clutch, said motor being controlled by the valve means including a second stage valve controlled by a manifold vacuum and spring operated switch, the parts of said mechanism, particularly the control means for the second stage valve, being so constructed and so operative that the second stage of clutch engaging operation of said motor is initiated when and if the manifold vacuum is lowered to a certain factor.

Yet another object of my invention is to provide, in an automotive vehicle including an accelerator, a change-speed transmission and a combined spring and centrifugal operated friction clutch, power means for controlling the operation of the spring means of said clutch said power means comprising a two-stage motor for disengaging the clutch and for controlling the clutch engaging operation of the springs of said clutch the second stage operation of said motor being initiated, during the clutch engaging operation of said motor, when either the accelerator is depressed a certain amount or the transmission is established in its cruising gear setting, for example the high gear setting of a three-speeds forward and reverse transmission.

Yet another object of my invention is to provide power means for quickly and completely disengaging a combined centrifugal and spring operated friction clutch; for with a conventional type of centrifugal clutch the disengagement thereof is delayed, resulting in a slipping of the clutch and an undesired deceleration of the vehicle, when the accelerator is released and the car is travelling at a relatively high speed. With my invention, however, that is the combination of centrifugally operated means and spring operating power means for effecting the disengagement and controlling the engagement of the clutch plates, there is a complete separation of said plates immediately after control means, for example the accelerator and either a governor or transmission controlling shift lever, is operated to effect a clutch disengaging operation of the power means.

One of the principal objects of my invention is to provide power means for controlling the operation of a combined centrifugal and spring operated friction clutch, said power means including a two-stage fluid pressure motor controlled in part by a so-called second stage valve which valve is in turn controlled by a transmission operated switch operable, when the transmission is established in a relatively high gear setting, to effect, through the intermediary of a valve operating solenoid, an opening of said second stage valve to thereby insure a completion of the clutch engaging operation of said motor; yet another object of my invention is to combine with this second stage valve controlling means either an accelerator operated switch or a switch operated by a manifold vacuum operated motor either one of said switches serving to so control the aforementioned second stage valve operating solenoid as to effect an opening of the second stage valve when the accelerator has been depressed sufficiently to close the switch operated thereby or the intake manifold vacuum has been reduced to a certain factor to thereby effect an operation of said manifold vacuum operated motor.

In general therefore it is the object of the invention to provide an automatically operable friction clutch structure operative to accurately simulate a skillful manual operation of said clutch to the end that the vehicle may be effectively accelerated under all conditions of service.

Other objects of the invention and desirable details of construction and combinations of parts will be apparent from the following description of a preferred embodiment of the invention, taken in conjunction with the accompanying drawings, in which.

Figure 1:
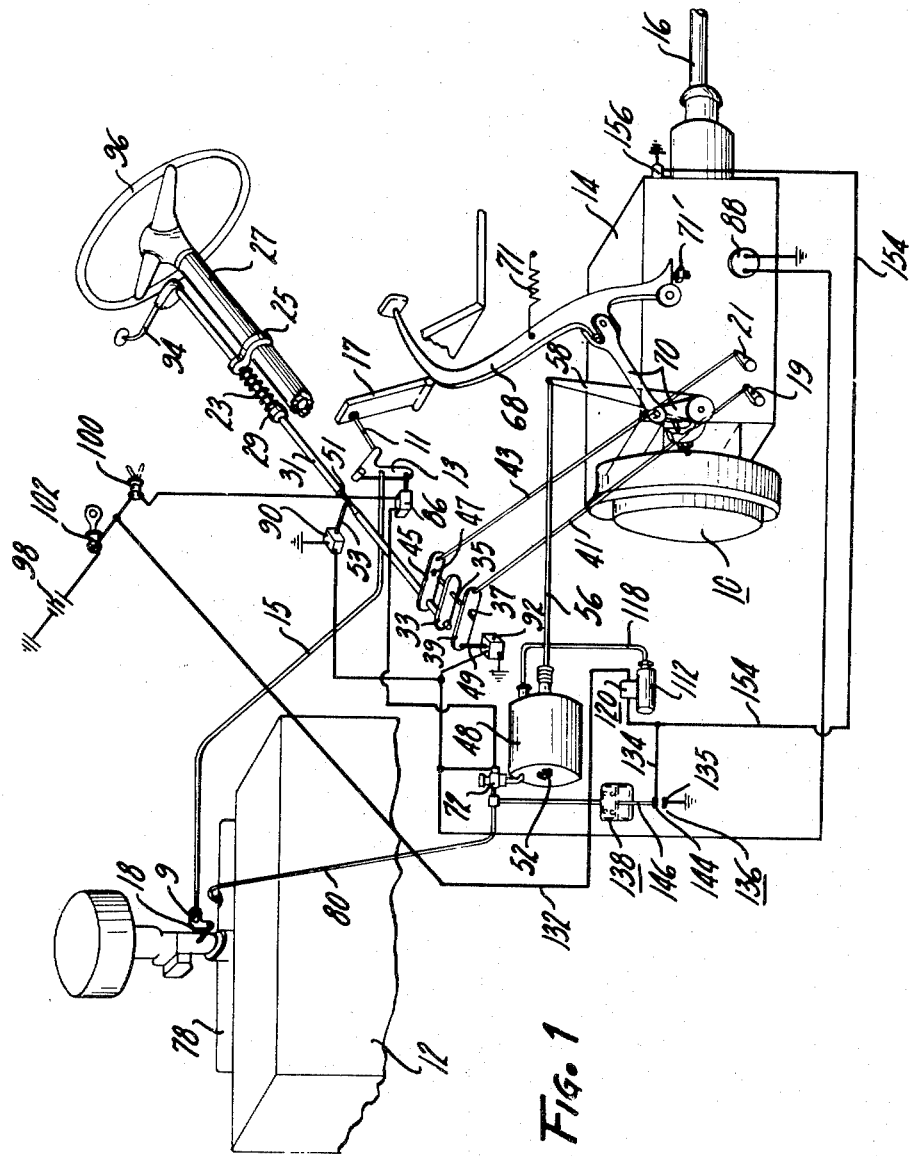
Figure 1 is a diagrammatic view of the clutch operating mechanism constituting the present invention.
Figure 5:
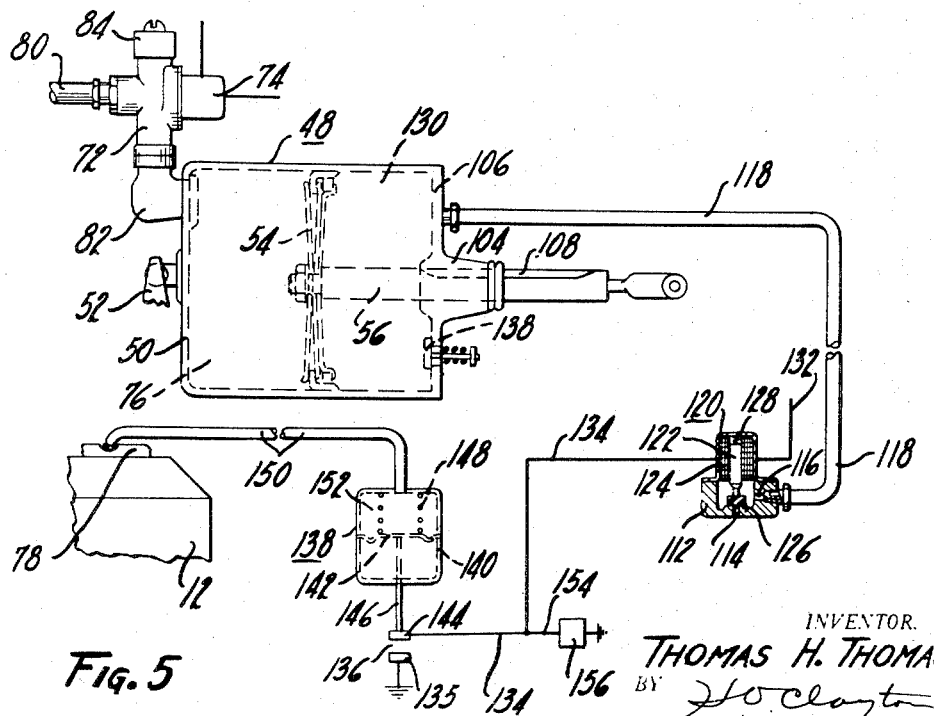
Figure 6:
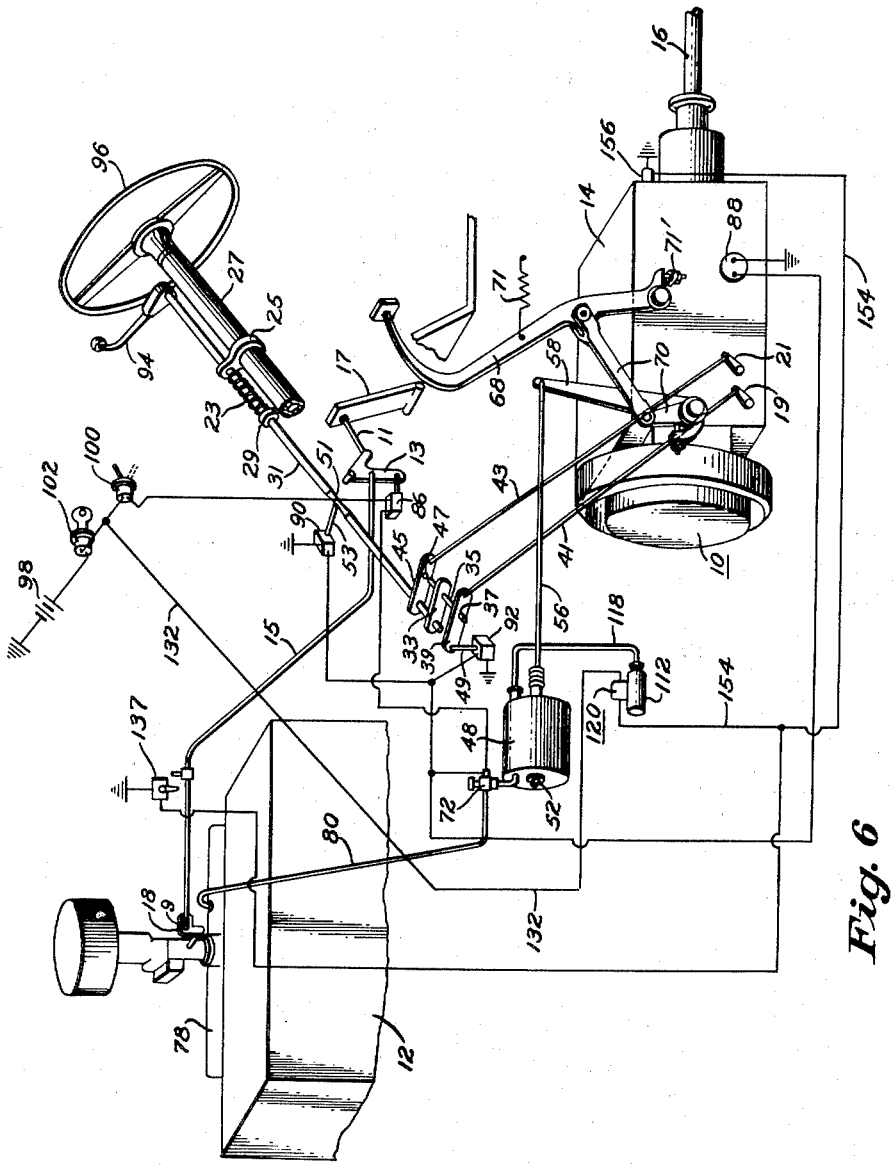

Figure 5 is a diagrammatic view, certain parts being shown in section, disclosing the second stage valve and power means for operating said valve and also disclosing the relative position of the parts of the clutch operating motor when the clutch plates are slightly loaded by the clutch springs of the mechanism and just prior to the clutch engaging operation of the centrifgual weights of said mechanism, and Figure 6 is a view, similar to Figure 1 disclosing another embodiment of my invention wherein an accelerator operated switch performs the same function as the pressure differential operated switch of Figures 1 and 5.

In that embodiment of the invention selected for illustration there is diagrammatically disclosed in Figure 1 a clutch mechanism 10 which is adapted to interconnect the internal combustion engine 12 of an automotive vehicle with a conventional change-speed transmission 14, the latter being drivably connected by a propeller shaft 16 with the driving wheels of the vehicle. The accelerator 17 of the vehicle is connected to a throttle operating crank 18 by means of a link 11, a lever 13, and a link 15, the latter being provided with a pin at its end fitting with a slotted portion 9 of the throttle operating crank 18 to provide a lost motion connection.

Figure 2:
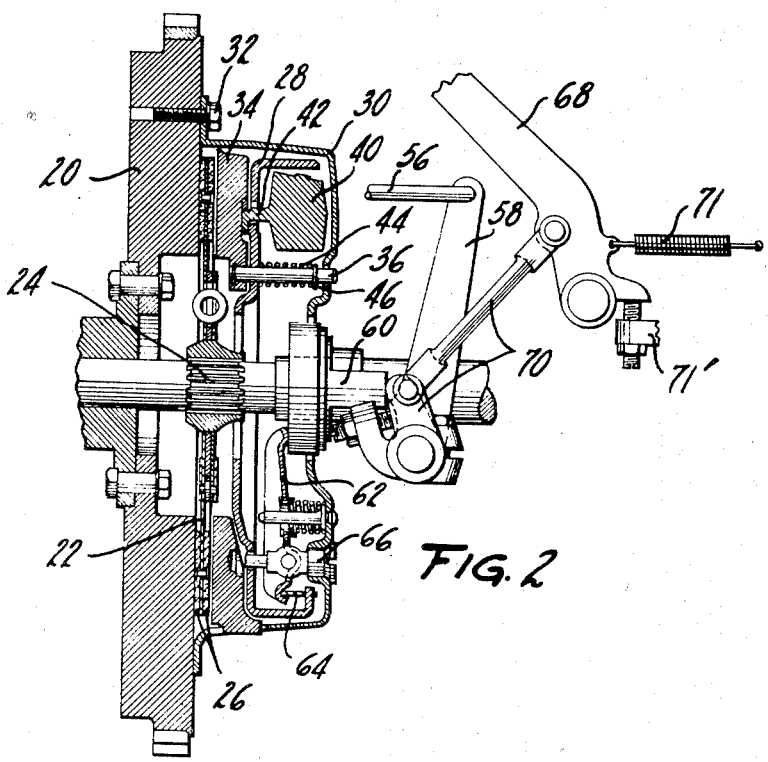
Figure 2 is a sectional view disclosing in detail the structure of the combined centrifugal and spring operated clutch to be controlled.
Figure 3:
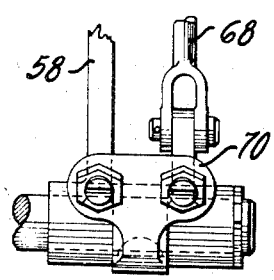
Figure 3 is a fragmentary view disclosing a portion of the connection interconnecting the clutch, the clutch motor and the clutch pedal.

My invention is directed to power means for controlling the operation of the clutch 10, the latter being of a combined centrifugal and spring operated type. As disclosed in Figure 2, a flywheel 20, drivably connected with the engine 12, constitutes the driving element of the clutch; and a disk 22, slidably keyed at 24 to a shaft drivably connected to the propeller shaft 16 and provided with friction rings 26, constitutes the driven clutch element. The means for forcing the driven clutch element into driving engagement with the driving clutch element comprises a pressure plate 28, mounted within a cup shaped housing 30 secured to the flywheel plate by fastenings 32. A ring 34, mounted on the plate by a plurality of pins 36, constitutes, together with the plate, a pressure applying unit, said unit being normally urged to the left, to engage the clutch, by means of a plurality of angularly spaced clutch springs 38, Figure 4.

A plurality of angularly spaced centrifugally operated weight members 40 each having a lever-like shank portion 42 extending through the plate 28 into engagement with the ring 34, are supplemented by the clutch engaging action of the springs 38 at or above a predetermined R. P. M. of the flywheel, the centrifugal force developed by the rotating weights serving to urge the weights outwardly in direct proportion to the angular speed of the flywheel and tending to force the ring from the plate and into engagement with the driven clutch element 26. Above the predetermined R. P. M. of the flywheel the clutch engaging springs 38 serve to supplement the clutch engaging operation of the weights 40. Springs 44 sleeved over the pins 36 between the plate 38 and stops 46, serve as return springs to keep the plate and ring together when the flywheel is static or below the aforementioned critical angular speed. The loading of the clutch is thus the additive result of the effects of the clutch springs 38 having a constant maximum effect and the centrifugally operated weights 40, the effect of the latter being a variable the value of which is a function of the R. P. M. of the flywheel.

The invention is specifically directed to power operated means for controlling both the disengagement and engagement of the aforementioned clutch, and in such fashion as to result in its most effective operation under various conditions of service of the vehicle.

To the above end there is provided a fluid pressure operated motor preferably a double-ended manifold vacuum operated motor 48 comprising a cylinder 50, pivotally secured to the chassis of the vehicle at 52, and a reciprocable piston element 54, the latter being operably connected to the pressure plate 28 of the pressure unit by a rod 56, crank 58, slidable collar 60, lever operating finger members 62 and pins 64. The finger members 62 are fulcrumed intermediate their ends upon pins 66, secured to the housing member 30. The pressure plate may also be operated to disengage the clutch by means of a conventional clutch pedal 68 interconnected with the sleeve 60 by linkage 70. A spring 71 serves to maintain the pedal 68 in its off position against a stop 71'.

Figure 4:
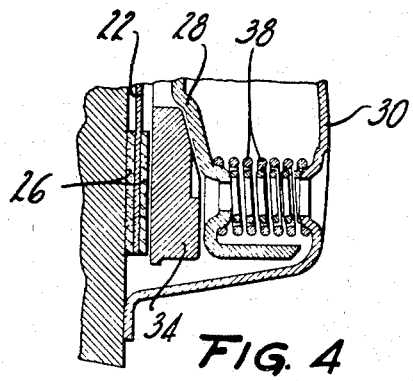
Figure 4 is an enlarged fragmentary and sectional view of a portion of the clutch structure of Figure 2 disclosing the clutch engaging springs.

One of the most important features of my invention resides in the valvular mechanism for controlling the operation of the aforementioned clutch operating motor; and said mechanism includes a three-way valve 72 of conventional design such as that disclosed in Figure 4 of the U. S. patent to Hruska 2,296,282 dated September 22, 1942. The valve 72 is operated by a solenoid 74 to open the valve, that is connect a compartment 76 of the motor 48 with the intake manifold 78 of the engine 12 via a conduit 80, valve 72, and a fitting 82, Figure 5. The three-way valve is also, of course, operated by a spring, not shown, to close the valve, that is vent the compartment 76 to the atmosphere via an air cleaner 84, the valve 72 and the fitting 82.

The solenoid 74 is preferably controlled by an accelerator operated switch 86, a grounded vehicle speed responsive governor operated switch 88 and grounded switches 90 and 92 actuated by a transmission and clutch controlling shift lever 94 conveniently mounted beneath the steering wheel 96 of the vehicle. As disclosed in Figure 1 the grounded governor operated switch 88 is wired in series with the solenoid 74 and the accelerator operated switch 86, the latter switch being wired to a grounded battery 98; likewise each of the grounded switches 90 and 92 are wired in series with the solenoid 74 and the accelerator operated switch 86. A cut out switch 100 and the ignition switch 102 of the ignition system of the vehicle are interposed in series in the wiring interconnecting the battery and accelerator operated switch.

Describing now the shift lever operated mechanism for operating the switches 90 and 92 the shift lever 96 is preferably connected with said switches and shift rail actuating cranks 19 and 21 by the force transmitting links and levers disclosed in Figure 1. Describing the operation of this force transmitting means and the parts thereof a spring 23, interposed between a stop 25 fixedly secured to the steering post 27 of the vehicle and a stop 29 fixedly secured to a shaft 31, serves to bias said shaft downwardly to the position disclosed in Figure 1. Now to the lower end of the shaft 31 there is fixedly secured a crank 33 through which extends a pin 35; and when said shaft is moved downwardly by the spring 23 one end of said pin extends within an opening 37 in a floating crank 39. To one end of the crank 39 there is pivotally connected a rod 41 said rod being pivotally connected at its other end to the end of the crank 19. This crank when rotated clockwise serves to actuate other force transmitting means within the casing of the three speeds forward and reverse transmission 14 to establish the transmission in its high gear setting; when said crank is rotated counter-clockwise the transmission is established in its second gear setting.

The crank 21 when rotated clockwise serves to establish the transmission in its low gear setting and when rotated counter-clockwise serves to establish the transmission in reverse gear. The connection between the crank 21 and the shift lever 94 includes a link 43 pivotally connected to a floating crank 45, said crank being rotatably mounted on the shaft 31 which is bodily movable through said crank. This crank is provided with an opening 47 to receive one end of the pin 35.

When the driver wishes to establish the transmission in its second gear setting he rotates the shift lever 94 counter-clockwise and this operation serves to rotate the floating crank 39. Now the switch 92 is preferably so constructed that the force necessary to close the same, that is the force necessary to compress a spring within the switch connected to its movable contact, is less than the force necessary to effect the initial movement of the high second shift rail. It follows therefore that the initial movement of the shift lever 94 results in a pivoting of the crank 39 about its connection with the rod 41; and this operation results in a closing of the clutch controlling switch 92. Continued movement of the shift lever, that is the movement after the switch 92 is closed and there is no possible further movement of a link 49 interconnecting the crank 39 with the switch 92, results in a pivoting of said crank about its pivotal connection with the link 49; and this operation results in the operation of the transmission to establish the same in its second gear setting. After this setting is established the driver removes his hand from the shift lever whereupon the aforementioned spring within the switch 92 operates to open said switch. This switch is so constructed that the same is also closed when the driver moves the shift lever 94 to establish the transmission in its high gear setting; and the spring means within said switch also functions to open the same when the high gear setting of the transmission has been established and the driver removes his hand from the shift lever.

Describing the operation of the switch mechanism to establish the transmission in either reverse gear or low gear, the driver first rotates the shift lever 94 upwardly in a plane perpendicular to the plane of the steering wheel 96; and this operation serves to bodily move the shaft 31 upwardly against the tension of the spring 23. The upper end of the pin 35 is by this operation moved into the opening 47 in the crank 45 and a subsequent rotation of the shift lever, either to establish the transmission in reverse or low gear, results in a rotation of the cranks 45 and 21 to effect one or the other of these settings of the transmission. The shaft 31 is provided with a recessed portion 51 which receives a pin 53 operably connected to the grounded switch 90; and as will be obvious from an inspection of Figure 1 when the shaft 31 is moved upwardly, in the operation of establishing the transmission in either reverse or low gear, the switch 90 is closed by virtue of the forcing of the pin 53 to the left, Figure 1, when the end of said pin is forced out of the recess 51 and onto the full bodied portion of the shaft.

There is thus provided, by the above described shift lever operated switch operating mechanism, means, cooperating with the accelerator operated switch 86, for effecting a clutch disengaging operation of the motor 10 during the first increment of movement of the shift lever as it is moved to establish the transmission in any one of its four gear settings. The parts of the mechanism are preferably so constructed and arranged that the clutch is disengaged before the transmission is operated. It is to be noted that the switch operating force transmitting means of my invention is such as to effect a closing of the switch mechanism when the shift lever is moved in either one of two different planes.

Referring now to Figure 5 disclosing the motor 48 and valvular means for controlling said motor there is provided valvular means for effecting a two-stage clutch engaging operation of said motor. The so-called first stage valve of said valvular means comprises a hub portion 104 of an end plate 106 of the motor which hub portion cooperates with a slot 108 in the connecting rod 56 interconnecting the piston 54 with the clutch operating crank 58. A so-called second stage valve of the valvular means, and power means for operating said valve, includes a hollow valve casing 112 comprising an atmospheric vent port 114 and a port 116 connected, by a conduit 118, with the end plate 106 of the motor 48. A solenoid 120, including an armature 122 and a winding 124, is mounted on the valve casing 112, and to the lower end of the armature there is connected a valve member 126 biased by a spring 128 to cover the port 114. When the solenoid is energized the armature is drawn upwardly to unseat the valve member 126, that is open the valve thereby venting a compartment 130 of the motor 48 to the atmosphere via the conduit 118 the port 116, the interior of the valve casing and the port 114. As disclosed in Figure 1 the winding 124 of the solenoid 120 is electrically connected, by a wire 132 to the electrical means leading to the battery 98 the connection preferably being made at a point in said electrical means whereby the solenoid 120 may not be energized until the ignition switch 102 is closed. The winding of this solenoid is also electrically connected, by a wire 134, to the fixed contact 135 of a grounded switch 136, said switch being operated by a differential pressure operated motor 138. As disclosed in Figure 5 the motor 138 comprises a double-ended casing 140 housing a power element 142, said element being connected to the movable contact 144 of the switch 136 by means of a rod 146. A spring 148, interposed between one end of the casing 140 and the power element 142, serves to bias said power element to a position to maintain the switch 136 closed. A conduit 150 connected to one end of the casing 140 serves to interconnect a chamber 152 of the motor 138 to the intake manifold 78 of the engine.

Completing the description of the power means for operating the second stage valve, the aforementioned wire 134, connected to the winding of the solenoid 120, is connected to a wire 154, Figures 1 and 5, which is connected to a grounded switch 156. The latter switch is operated by a spring, not shown, to open said switch and by the transmission 14 to close said switch, the closing of said switch being effected when the transmission is established in what may be termed a cruising gear setting that is a relatively high gear setting.

Describing to a certain degree the operation of the second stage valve and operating means therefore, the two constituting the most important feature of my invention, the solenoid 120 is energized to open said valve when either the transmission is established in its cruising gear setting to close the switch 156 or the accelerator is depressed far enough to increase the gaseous pressure within the intake manifold, that is lower the vacuum; for when said pressure reaches a certain factor then the spring 148 within the motor 138 functions to close the switch 136.

Describing now the complete operation of the clutch controlling mechanism constituting my invention, with the accelerator released, the vehicle at a standstill and the engine dead the governor operated and accelerator operated switches 88 and 86 are closed, accordingly the solenoid 74 is energized to open the three-way valve 72. However, the gaseous pressure within the intake manifold is at this time equal to the pressure of the atmosphere, accordingly the motor it not energized.

Now when the engine is started the intake manifold is immediately partially evacuated by virtue of hte pumping action of the engine pistons, accordingly the compartment 76 of the motor 48 is also partially evacuated; and this results in a movement of the piston 54 to the left, Figure 5, to effect a movement of the pressure plate of the clutch away from the driven clutch plate. This movement of the piston is effected inasmuch as the same is then subjected to a differential of pressures the compartment 130 of the motor being maintained at atmospheric pressure by virtue of the operation of a check valve 138 mounted in the end plate 106 of the motor.

The driver will then pobably establish the transmission in its low gear setting by an operation of the shift lever 94 and after this operation is effected he will then depress the accelerator to effect an engagement of the clutch to get the car under way. Describing the clutch engaging operation of the motor 48, the first increment of movement of the accelerator serves to open the switch 86; and the construction and arrangement of the parts of the mechanism, particularly the construction of the lost motion connection 9, is such that said switch is opened before the throttle is opened. Now with the opening of the switch 86 the solenoid 74 is de-energized thereby permitting the spring within the valve 72 to close said valve, that is effect a venting of the compartment 76 to the atmosphere; and when said compartment is vented to the atmosphere this operation initiates a clutch engaging movement of the piston 54 under the action of the several clutch springs 38. The piston is then moved to the right, Figure 5, the air in the compartment 130 being pushed out of said compartment via the slot 108 in the connecting rod 56.

When the piston has moved a certain distance to the right the slot is covered by the hub portion 104 all as disclosed in Figure 5, whereupon the piston either comes to a stop or its rate of movement is at least reduced, the operation effected being dependent upon the mode of operation of the accelerator. Now the length of the slot 108 is so determined and the remainder of the parts of the mechanism are so constructed and arranged that this first stage operation of the valve means is completed when the pressure plate of the clutch has moved sufficiently to effect a slight loading of the driving and driven clutch plates; and this operation is effected before or at substantially the same instant that the opening movement of the throttle is initiated. It follows therefore that the clutch plates are to a degree spring loaded when the operation of the centrifugally operated weights 40 is initiated. If at this time the R. P. M. of the engine is not high enough to effect a clutch engaging operation of the centrifugal weights then the clutch springs 38 serve, if the vehicle load is not too high, to insure a sufficient engagement of the clutch to effect a forward motion of the vehicle.

The driver, in his operation of the accelerator, usually does not arrest the throttle opening movement of said control means, accordingly continued depression of the accelerator will serve to open the throttle to speed up the engine; and when the R. P. M. of the engine is above a critical factor, which is of course relatively low, then the centrifugal weights 40 function to load the ring 34 of the pressure plate unit to complete the engagement of the clutch.

As previously described the second stage valve comes into play, to effect an operation of the motor 48 to supplement the clutch engaging effect of the centrifugal weights, when the intake manifold is reduced sufficiently to effect the switch closing operation of the motor 138; and this operation is effected when the throttle valve of the carburetor is opened to a certain degree by a depression of the accelerator. This supplemental clutch engaging operation of the motor 48 is particularly helpful when the engine is laboring due to the car being heavily loaded or when a car is climbing an incline; for when the engine is laboring, its R. P. M. and the corresponding force exerted by the centrifugal weights 40 are relatively low. It follows therefore that the clutch, without the supplemental clutch engaging operation of the clutch springs, will slip under this condition however the clutch engaging force exerted by said springs, as a result of the second stage operation of the motor 48, will supplement the clutch engaging force exerted by the centrifugal weights thereby preventing any slipping of the clutch.

As an alternative to the provision of the above discussed manifold vacuum operated switch 136 there may be provided a grounded accelerator operated breaker switch 137, Figure 6, for controlling the second stage operation of the motor 48, said switch being substituted for the switch 136. This switch will be closed, to complete the electrical circuit including the solenoid 120, when the accelerator is depressed sufficiently to appreciably open the throttle.

Continuing the description of the operation of the mechanism constituting my invention, it will be assumed that the vehicle is under way whereupon the driver will release the accelerator and then operate the shift lever 94 to establish the transmission in a higher gear ratio setting. As described above the first increment of movement of the shift lever serves to close one or the other of the switches 90 or 92 depending of course upon the operation of said lever. The accelerator being at the time released to close the switch 86, it follows that the motor 48 is again energized to effect a disengagement of the clutch mechanism, all as previously described. After the operation of the transmission is completed, the driver removes his hand from the shift lever thereby opening one or the other of the switches 90 or 92 to thereby effect an operation of the three-way valve 72 and initiate the above described clutch engaging operation of the motor 48. Subsequent depression of the accelerator will then, as described above, effect a second stage of clutch engagement by the operation of the centrifugal weights; and, as described above, this operation is supplemented by the second stage operation of the motor 48 when the accelerator is appreciably depressed.

When the vehicle is slowed down below a certain speed then the governor operated switch 88 is closed and, if the accelerator is at the time released to close the switch 86, then the motor 48 is again energized to effect a disengagement of the clutch mechanism.

Referring to the transmission control switch 156, it is necessary to supplement the clutch engaging operation of the centrifugal weights when the clutch is reengaged by a relatively slight depression of the accelerator, the transmission being established at the time in a relatively high gear setting; and the inclusion of the switch 156 in the control means results in this operation of the mechanism.

There is thus provided means, including the clutch springs 38 and the motor 48 for operating the same, for supplementing the clutch engaging operation of the centrifugal weights 40 to insure the desired acceleration of the vehicle and prevent the clutch plate wearing effect of a slipping clutch when the engine is laboring.

While one illustrative embodiment has been described, it is not my intention to limit the scope of the invention to that particular embodiment, or otherwise than by the terms of the appended claims.

I claim:

1. In an automotive vehicle provided with an internal combustion engine comprising an intake manifold, a combined centrifugal and spring operated clutch, a vehicle speed responsive governor and an accelerator; power means, including a two-stage pressure differential operated motor, for effecting the disabling of both the centrifugally operated and spring means of said clutch to thereby disengage the clutch and for controlling the clutch engaging operation of the spring means of the clutch, valve means for controlling the operation of said motor comprising a three-way valve, a first stage valve, and a second stage valve, and means for controlling the operation of the valve means including a grounded manifold vacuum operated switch for controlling the operation of the second stage valve, an accelerator operated switch, and a grounded governor operated switch connected in series with the accelerator operated switch, for controlling the operation of the three-way valve, the parts of the mechanism being so constructed and arranged and so operative that the three-way valve is rendered operative to effect a clutch disengaging operation of the motor during the last increment of releasing movement of the accelerator and is rendered operative, during the first increment of depression of the accelerator, to initiate the clutch engaging operation of said motor, the parts being also so constructed and arranged and so operative that the second stage valve is rendered operative, to initiate the second stage of clutch engaging operation of the motor, when the gaseous pressure within the intake manifold reaches a certain critical factor, said operation effecting a closure of the manifold vacuum operated switch.

2. In an automotive vehicle provided with an internal combustion engine having an intake manifold and a combined centrifugal and spring operated friction clutch comprising a driving member, a driven member, a pressure plate, centrifugally operated means operable to force said plate into contact with the driven member and yieldable means also operable to force said plate into contact with the driven member, power means for moving said pressure plate sufficiently away from the driven clutch plate to compress the yieldable means and to render the centrifugally operated means incapable of exerting any force on the pressure plate and for controlling the spring operated movement of said pressure plate toward the driven clutch plate, said power means comprising a pressure differential operated motor including a double-ended casing and a power element therein, force transmitting means, including a connecting rod extending through one end of the casing, interconnecting said power element and pressure plate, and valve means for controlling the operation of said motor comprising a three-way valve and further comprising power operated valve means for effecting two stages of clutch engaging movement of the power element, said latter valve means comprising a first stage valve including a slotted portion of said connecting rod and a second stage valve, a solenoid and a spring for actuating said second stage valve and means for controlling the operation of said solenoid and spring including a manifold vacuum and spring operated switch.

3. In an automotive vehicle provided with a change-speed transmission, a transmission operating selector lever, a combined centrifugal and spring operated friction clutch comprising a driving member, a driven member, a pressure plate, centrifugally operated means operable to force said pressure plate into contact with the driven member and yieldable means also operable to force said pressure plate into contact with the driven member, power means for moving said pressure plate sufficiently away from the driven clutch plate to compress the yieldable means and to render the centrifugally operated means incapable of exerting any force on the pressure plate and for controlling the spring operated movement of said pressure plate toward the driven clutch plate, said power means comprising a pressure differential operated motor including a casing and a power element therein, force transmitting means interconnecting said power element and pressure plate, valve means for controlling the operation of said motor comprising a three-way valve and further comprising power operated valve means for effecting two stages of clutch engaging movement of the power element, means for controlling the operation of the three-way valve including a solenoid and a solenoid controlling switch means operated by the selector lever, and means for controlling the operation of a part of said two-stage valve means including a switch actuated by the change-speed transmission.

4. In an automotive vehicle provided with an accelerator and a transmission operating selector lever, a combined centrifugal and spring operated friction clutch comprising a driving member, a driven member, a pressure plate, centrifugally operated means operable to force said pressure plate into contact with the driven member and yieldable means also operable to force said pressure plate into contact with the driven member, power means for moving said pressure plate sufficiently away from the driven clutch plate to compress the yieldable means and to render the centrifugally operated means incapable of exerting any force on the pressure plate and for controlling the spring operated movement of said pressure plate toward the driven clutch plate, said power means comprising a pressure differential operated motor including a casing and a power element therein, force transmitting means interconnecting said power element and pressure plate, valve means for controlling the operation of said motor comprising a three-way valve and further comprising power operated valve means for effecting two stages of clutch engaging movement of the power element, means for controlling the operation of the three-way valve including a solenoid, a vehicle speed responsive solenoid controlling governor operated switch and a solenoid controlling switch means operated by the selector lever, and means for controlling the operation of the power operated two-stage valve means comprising means rendered operative, to effect the second stage operation of said valve means, when the accelerator is depressed to a certain position.

5. In an automotive vehicle provided with an internal-combustion engine having an intake manifold, a throttle valve, an accelerator, and a combined centrifugal and spring operated friction clutch including a driving plate, a driven plate, a pressure plate and means for forcing said pressure plate into contact with said driven plate; means for operating said clutch comprising a fluid pressure operated motor including a casing and a power element therein, force transmitting means, including a lost motion connection, interconnecting the accelerator and throttle valve, valve means for controlling the operation of said motor including a three-way valve and further including power operated bleed valve means for effecting two stages of clutch engaging operation of said motor, means for operating said bleed valve means comprising a switch and a manifold vacuum and spring operated means for operating said switch, and means for controlling the operation of the three-way valve comprising an accelerator operated switch and another switch, said accelerator operated switch being opened, to effect a certain operation of the three-way valve, during the first increment of throttle opening movement of the accelerator and, by virtue of the aforementioned lost motion connection, before the throttle is opened, said operation initiating the first stage operation of the bleed valve means.

6. In an automotive vehicle provided with a change-speed transmission, a throttle valve, a transmission controlling shift lever, an accelerator, and a combined centrifugal and spring operated friction clutch including a driving plate, a driven plate, a pressure plate and means for forcing said pressure plate into contact with said driven plate; means for operating said clutch comprising a fluid pressure operated motor including a casing and a power element therein, force transmitting means, including a lost motion connection, interconnecting the accelerator and throttle valve, valve means for controlling the operation of said motor including a three-way valve and further including power operated bleed valve means for effecting two stages of clutch engaging operation of said motor, means, including a power operated switch and a transmission operated switch, for controlling the operation of a part of said two-stage valve means, and means for controlling the operation of the three-way valve comprising an accelerator operated switch and another switch, said accelerator operated switch being opened, to effect a certain operation of the three-way valve, during the first increment of throttle opening movement of the accelerator and, by virtue of the aforementioned lost motion connection, before the throttle is opened, said operation initiating the first stage operation of the bleed valve means.

7. In an automotive vehicle provided with an internal combustion engine having an intake manifold, a throttle valve, a transmission controlling shift lever, an accelerator, and a combined centrifugal and spring operated friction clutch including a driving plate, a driven plate, a pressure plate and means for forcing said pressure plate into contact with said driven plate; means for operating said clutch comprising a fluid pressure operated motor including a casing and a power element therein, force transmitting means, including a lost motion connection, interconnecting the accelerator and throttle valve, valve means for controlling the operation of said motor including a three-way valve and further including bleed valve means, comprising a second stage valve, for effecting two stages of clutch engaging operation of said motor, means, including a differential pressure operated motor for operating said second stage valve, and means for controlling the operation of the three-way valve comprising an accelerator operated switch, a governor operated switch and a shift lever operated switch mechanism, said accelerator operated switch being opened, to effect a certain operation of the three-way valve, during the first increment of throttle opening movement of the accelerator and, by virtue of the aforementioned lost motion connection, before the throttle is opened, said operation initiating the first stage operation of the bleed valve means.

THOMAS H. THOMAS.

REFERENCES CITED

The following references are of record in the file of this patent:

UNITED STATES PATENTS

| Number | Name | Date |
|---|---|---|
| 2,049,738 | Hill et al. | Aug. 4, 1936 |
| 2,163,891 | Sanford | June 27, 1939 |
| 2,168,682 | Paine | Aug. 8, 1939 |
| 2,177,662 | Kliesrath et al. | Oct. 31, 1939 |
| 2,212,954 | Price et al. | Aug. 27, 1940 |
| 2,217,976 | Watts | Oct. 15, 1940 |
| 2,248,377 | Nutt | July 8, 1941 |
| 2,251,598 | Padgett | Aug. 5, 1941 |
| 2,296,282 | Hruska | Sept. 22, 1942 |
| 2,344,399 | Eaton | Mar. 14, 1944 |